United States Patent
Yoshioka

(10) Patent No.: US 9,584,685 B2
(45) Date of Patent: Feb. 28, 2017

(54) IMAGE FORMING APPARATUS

(71) Applicant: KYOCERA Document Solutions Inc., Osaka-shi, Osaka (JP)

(72) Inventor: Yoshiki Yoshioka, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/050,506

(22) Filed: Feb. 23, 2016

(65) Prior Publication Data

US 2016/0248927 A1 Aug. 25, 2016

(30) Foreign Application Priority Data

Feb. 25, 2015 (JP) ................................. 2015-035766

(51) Int. Cl.
*H04N 1/00* (2006.01)
*G06K 9/00* (2006.01)

(52) U.S. Cl.
CPC ..... *H04N 1/00801* (2013.01); *G06K 9/00469* (2013.01); *H04N 1/0032* (2013.01); *H04N 1/00244* (2013.01); *G06K 2009/0059* (2013.01); *G06K 2209/01* (2013.01); *H04N 2201/0094* (2013.01)

(58) Field of Classification Search
None
See application file for complete search history.

(56) References Cited

U.S. PATENT DOCUMENTS

| 6,233,354 | B1* | 5/2001 | Nakatani | G06K 9/03 382/224 |
| 2003/0179406 | A1* | 9/2003 | Seto | H04N 1/00132 358/1.15 |
| 2005/0219640 | A1* | 10/2005 | Kasatani | H04N 1/00204 358/402 |
| 2006/0028675 | A1* | 2/2006 | Watanabe | G07F 17/0014 358/1.15 |
| 2006/0291692 | A1* | 12/2006 | Nakao | G06K 9/6807 382/101 |
| 2008/0028220 | A1* | 1/2008 | Wyssen | G07D 7/20 713/176 |
| 2010/0097629 | A1* | 4/2010 | Takahashi | G06F 21/6209 358/1.14 |

(Continued)

FOREIGN PATENT DOCUMENTS

| JP | 2007010809 A | 1/2007 |
| JP | 2011183592 A | 9/2011 |
| JP | 2012134706 A | 7/2012 |

*Primary Examiner* — Ming Hon

(57) ABSTRACT

An image forming apparatus includes a character distinguishing unit, a character string extraction unit, a character specifying unit, a determination unit, an overwrite image data generation unit, and a control unit. The overwrite image data generation unit generates, if it is determined by the determination unit that there is a plurality of matches, overwrite image data that has been overwritten such that a character specified by the character specifying unit is indistinguishable as a character. The control unit performs control using the overwrite image data generated by the overwrite image data generation unit so as to cause a printing unit to perform printing on a printed material set in a printed material setting unit.

8 Claims, 10 Drawing Sheets

(56) References Cited

U.S. PATENT DOCUMENTS

| | | | | |
|---|---|---|---|---|
| 2010/0195123 A1* | 8/2010 | Fujioka | ................ | G06F 3/1207 |
| | | | | 358/1.9 |
| 2011/0058228 A1* | 3/2011 | Inamoto | ............... | G06K 9/2063 |
| | | | | 358/448 |
| 2012/0050780 A1* | 3/2012 | Osawa | ................. | G06F 9/4881 |
| | | | | 358/1.13 |
| 2012/0274803 A1* | 11/2012 | Nako | .................... | G06K 9/228 |
| | | | | 348/222.1 |

* cited by examiner

| | DICTIONARY DATA | |
|---|---|---|
| 72a | ABC | XXXXX |
| 72b | BBC | YYYYY |
| 72c | ABE | ZZZZZ |
| 72d | AEE | WWWWW |
| 72e | DEF | VVVVV |
| | : | : |
| 72f | ZEF | UUUUU |

IMAGE FORMING APPARATUS

INCORPORATION BY REFERENCE

The disclosure of Japanese Patent Application No. 2015-35766 filed on Feb. 25, 2015, including the specification, drawings and abstract is incorporated herein by reference in its entirety.

BACKGROUND

This disclosure relates to an image forming apparatus.

In an image forming apparatus, which is typified by a digital multifunction peripheral and the like, an image of an original document is read by an image reading unit, and then, a photoreceptor included in an image forming unit is irradiated with light, on the basis of the read image, to form an electrostatic latent image on the photoreceptor. Thereafter, a developer, such as a charged toner and the like, is fed onto the formed electrostatic latent image to form a visible image, the image is transferred and fixed onto a sheet of paper, and then, the paper is discharged to the outside of the apparatus.

There has been a known technology in which, for a printed material that was output after an image was formed on a sheet of paper, image data is overwritten thereon again such that characters are indistinguishable, thereby preventing leakage of confidential information.

A typical image input and output system includes an image forming apparatus including an image reading unit, an image output unit, a reading and overwriting unit, a communication unit, a storage unit, and an image forming unit. The image reading unit reads an area in a printed material to generate pre-overwrite image data, which is image data before the read area is overwritten. The image output unit outputs an image for concealment to the read area in which reading has been already performed and overwrites the read area, thereby making the read area into a concealment area. The reading and overwriting unit includes an interface unit that outputs the pre-overwrite image data. The communication unit receives the pre-overwrite image data from the reading and overwriting unit. The storage unit stores the pre-overwrite image data received by the communication unit. The image forming unit forms an image, on the basis of the pre-overwrite image data.

Also, a typical image forming apparatus includes a storage unit, an extraction unit, a determination unit, and a painting-out unit. The storage unit stores a specific character that is a painting-out target in advance. The extraction unit extracts, as a painting-out target character, a character that matches the specific character stored in the storage unit from a print medium on which characters have been already printed. The determination unit determines a painting-out area on the print medium, which includes the painting-out target character extracted by the extraction unit. The painting-out unit paints out the painting-out area determined by the determination unit such that the painting-out target character extracted by the extraction unit is indistinguishable.

Also, a typical image processing apparatus includes an already printed surface specifying unit, a printing unit, and an obfuscation printing unit. The already printed surface specifying unit specifies an already printed surface of a sheet of paper that is supplied. The printing unit performs printing on a printable surface of the sheet of paper, which has been specified by already printed surface specifying unit. The obfuscation printing unit performs printing of a plurality of overwrite patterns on the already printed surface of the sheet of paper, which has been specified by the already printed surface specifying unit.

SUMMARY

According to an aspect of the present disclosure, an image forming apparatus includes a printed material setting unit, a printing unit, a printed material image reading unit, a character distinguishing unit, a character string extraction unit, a character specifying unit, a determination unit, an overwrite image data generation unit, and a control unit. The printed material setting unit causes a user to set a printed material on which a character is printed therein. The printing unit performs printing on the printed material set in the printed material setting unit. The printed material image reading unit reads an image printed on the printed material set in the printed material setting unit. The character distinguishing unit distinguishes a character from the image read by the printed material image reading unit. The character string extraction unit extracts a character string formed of a plurality of characters distinguished by the character distinguishing unit. The character specifying unit causes the user to specify one of the plurality of characters forming the character string extracted by the character string extraction unit. The determination unit determines whether or not there is a plurality of matches between character string data formed of a part of the extracted character string other than the character specified by the character specifying unit and respective parts of pieces of character string data registered in dictionary data in which a plurality of character strings each of which is formed of a plurality of characters are registered in advance, each of which is formed of characters other than a character in the same position as a sequence position of the character specified by the character specifying unit. The overwrite image data generation unit generates, if it is determined by the determination unit that there is a plurality of matches, overwrite image data that has been overwritten such that the character specified by the character specifying unit is indistinguishable as a character. The control unit performs control using the overwrite image data generated by the overwrite image data generation unit so as to cause the printing unit to perform printing on the printed material set in the printed material setting unit.

DETAILED DESCRIPTION

Figure 1:
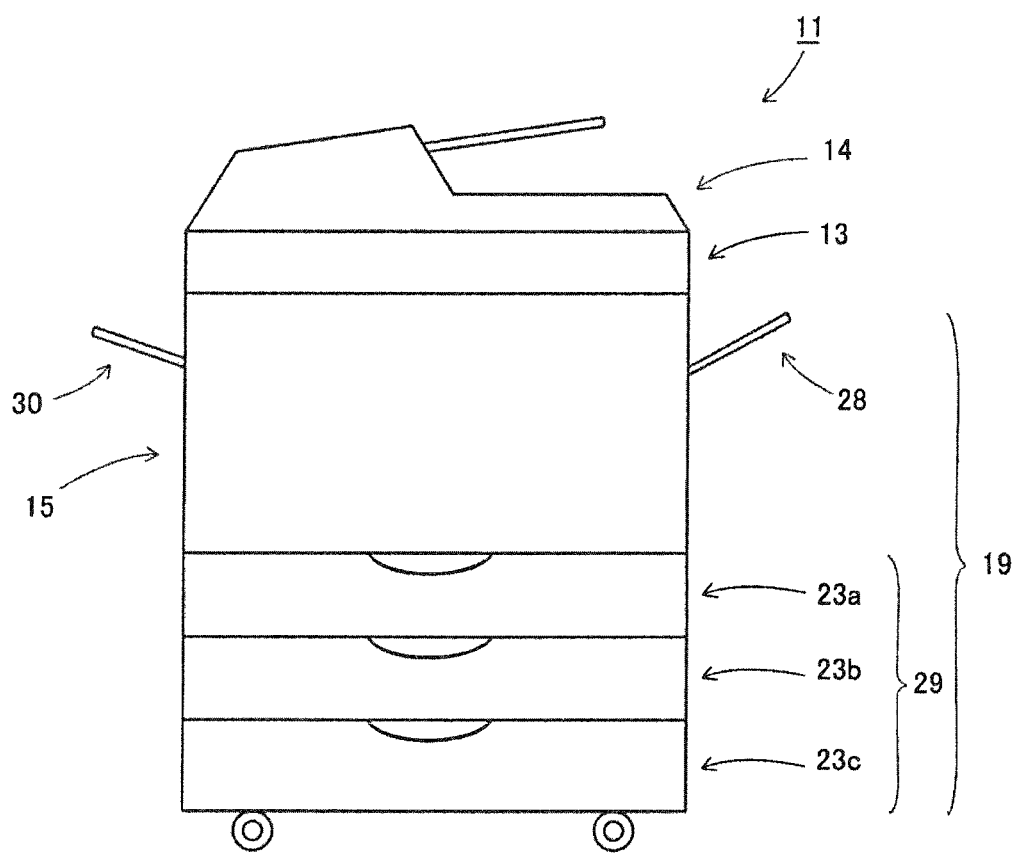
FIG. 1 is a schematic perspective view illustrating an outer appearance of a digital multifunction peripheral achieved by applying an image forming apparatus according to an embodiment of the present disclosure to a digital multifunction peripheral.
Figure 2:
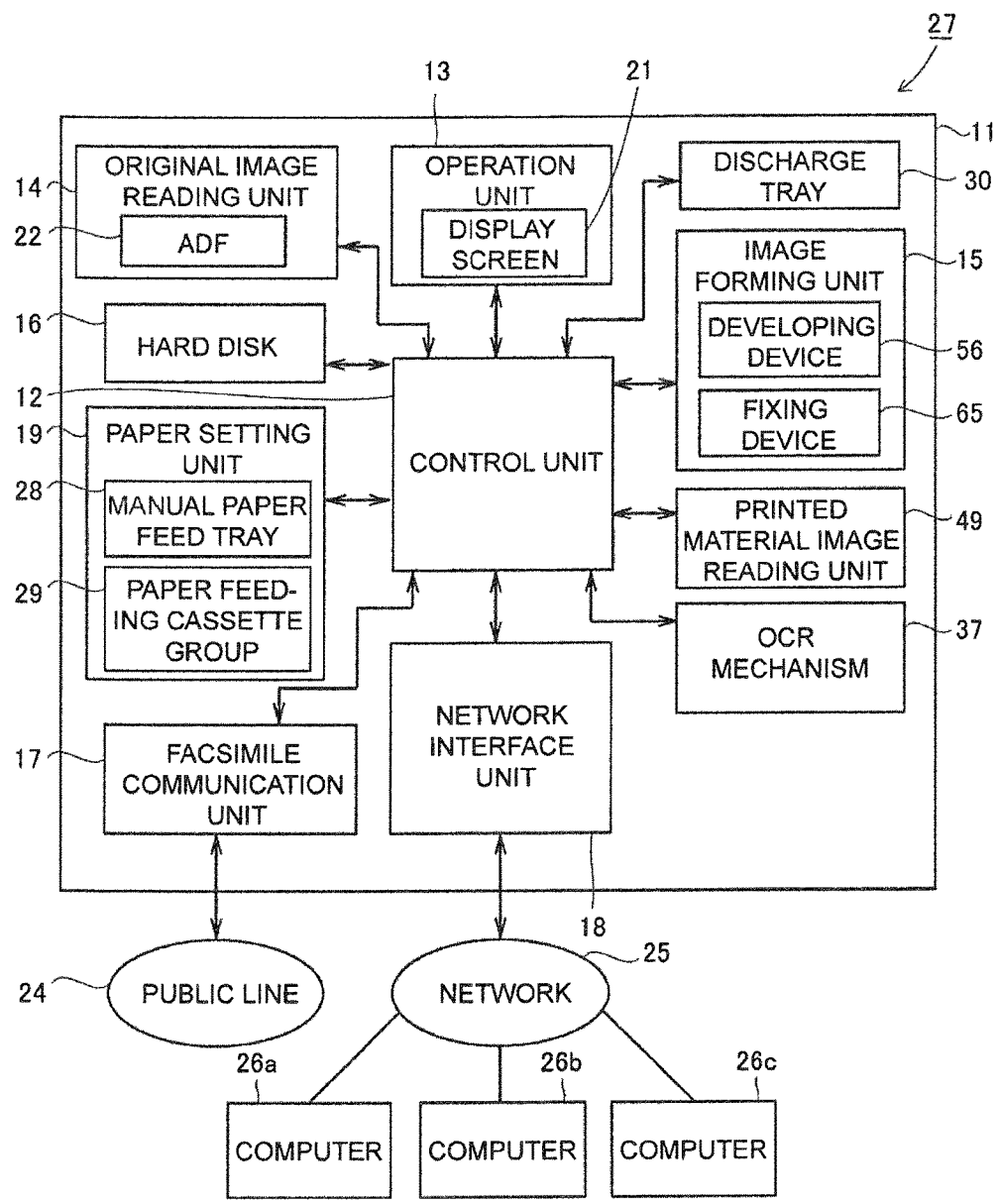
FIG. 2 is a block diagram illustrating a configuration of the digital multifunction peripheral achieved by applying an image forming apparatus according to the embodiment to a digital multifunction peripheral.

An embodiment of the present disclosure will be described below. FIG. 1 is a schematic perspective view illustrating an outer appearance of a digital multifunction peripheral achieved by applying an image forming apparatus according to the embodiment of the present disclosure to a digital multifunction peripheral. FIG. 2 is a block diagram illustrating a configuration of the digital multifunction peripheral achieved by applying an image forming apparatus according to the embodiment to a digital multifunction peripheral.

With reference to FIG. 1 and FIG. 2, a digital multifunction peripheral 11 includes a control unit 12, an operation unit 13, an original image reading unit 14, a printed material image reading unit 49, a paper setting unit 19, an image forming unit 15, a discharging tray 30, a hard disk 16 serving as a storage unit, a facsimile communication unit 17, and a network interface unit 18 configured to provide connection with a network 25.

The control unit 12 controls the entire digital multifunction peripheral 11. The operation unit 13 includes a display screen 21 configured to display information transmitted from the digital multifunction peripheral 11 side and contents of input performed by a user. The operation unit 13 causes the user to input image forming conditions, such as the number of print copies, a gradation property, and the like, and on and off of power. The original image reading unit 14 includes an auto document feeder (ADF) 22 configured to automatically feed an original document set therein to a reading position. The original image reading unit 14 read an image of an original document. The printed material image reading unit 49 reads an image of a printed material. The paper setting unit 19 includes a manual paper feeding tray 28 in which paper is manually set and a paper feeding cassette group 29 that is capable of storing a plurality of sheets of paper with different sizes. In the paper setting unit 19, a printed material to which printing has been already performed may be set. The paper setting unit 19 serving as a printed material setting unit causes the user to set sheets of paper that are to be fed to the image forming unit 15. The image forming unit 15 forms an image on the basis of images read by the original image reading unit 14 and the printed material image reading unit 49 and image data transmitted via the network 25. The discharging tray 30 discharges a sheet of paper after an image is formed on the sheet of paper by the image forming unit 15. The hard disk 16 stores transmitted image data, input image forming conditions, and the like. The facsimile communication unit 17 is coupled to a public line 24 and performs facsimile transmission and facsimile reception.

Note that the digital multifunction peripheral 11 includes a dynamic random access memory (DRAM), and the like, to and from which image data is written and read, but the illustration and description of them will be omitted. In FIG. 2, arrows indicate flows of data regarding a control signal, control, and an image. Note that, as illustrated in FIG. 1, in this embodiment, the paper feeding cassette group 29 includes three paper feeding cassette 23a, 23b, and 23c.

The digital multifunction peripheral 11 forms an image in the image forming unit 15 using an original document read by the original image reading unit 14, and thus, operates as a copy machine. The digital multifunction peripheral 11 forms an image in the image forming unit 15 using image data transmitted from computers 26a, 26b, and 26c coupled to the network 25 via the network interface unit 18 to print the formed image on a sheet of paper, and thus, operates as a printer. That is, the image forming unit 15 operates as a printing unit that prints a requested image. The digital multifunction peripheral 11 forms an image in the image forming unit 15 via the DRAM using image data transmitted from the public line 24 via the facsimile communication unit 17, or transmits image data of an original document read by the original image reading unit 14 to the public line 24 via the facsimile communication unit 17, and thus, operates as a facsimile apparatus. That is, the digital multifunction peripheral 11 has a plurality of functions, such as a copy function, a printer function, a facsimile function, and the like, for image processing. Furthermore, for each function, a function that may be set in detail is provided.

An image forming system 27 according to this embodiment, which includes a digital multifunction peripheral 11, includes the digital multifunction peripheral 11 having the above-described configuration and the plurality of computers 26a, 26b, and 26c coupled to the digital multifunction peripheral 11 via the network 25. In this embodiment, as the plurality of computers 26a, 26b, and 26c, three computers are illustrated. Each of the computers 26a, 26b, and 26c is capable of making a print request to the digital multifunction peripheral 11 via the network 25 to perform printing. The digital multifunction peripheral 11 and the computers 26a, 26b, and 26c may be coupled to one another via a wire using a local area network (LAN) cable, or the like, and also, may be wirelessly coupled to one another, and a configuration in which another digital multifunction peripheral and a server are coupled in the network 25 may be also employed.

Figure 3:
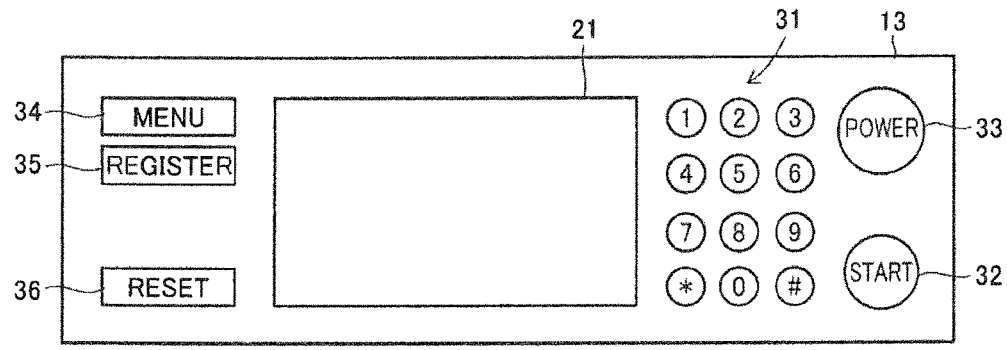
FIG. 3 is an outside view illustrating a schematic configuration of an operation unit.

Next, a configuration of the above-described operation unit 13 will be described further in detail. FIG. 3 is an outside view illustrating a schematic configuration of the operation unit 13. With reference to FIG. 3, the operation unit 13 includes a numeric keypad 31 used by the user to input numbers 0 to 9 and symbols, such as "*" and "#", used by the user to input the number of print copies and the like, a start key 32 used by the user to instruct a start of printing and a start of facsimile transmission, a power key 33 used by the user to input on and off of power of the digital multifunction peripheral 11, a menu key 34 used by the user to instruct selection of a printer function, a copy function, or the like, of the digital multifunction peripheral 11, a registration key 35 used by the user to instruct various image forming conditions and user registration, a reset key 36 used by the user to cancel contents of an instruction input by the user using the numeric keypad 31 or the like, and the above-described display screen 21. The display screen 21 includes a liquid crystal touch panel function and allows the user to select a function and the like from the display screen 21 as well as input image forming conditions and the like by pressing thereon with a finger of the user or the like.

Figure 4:
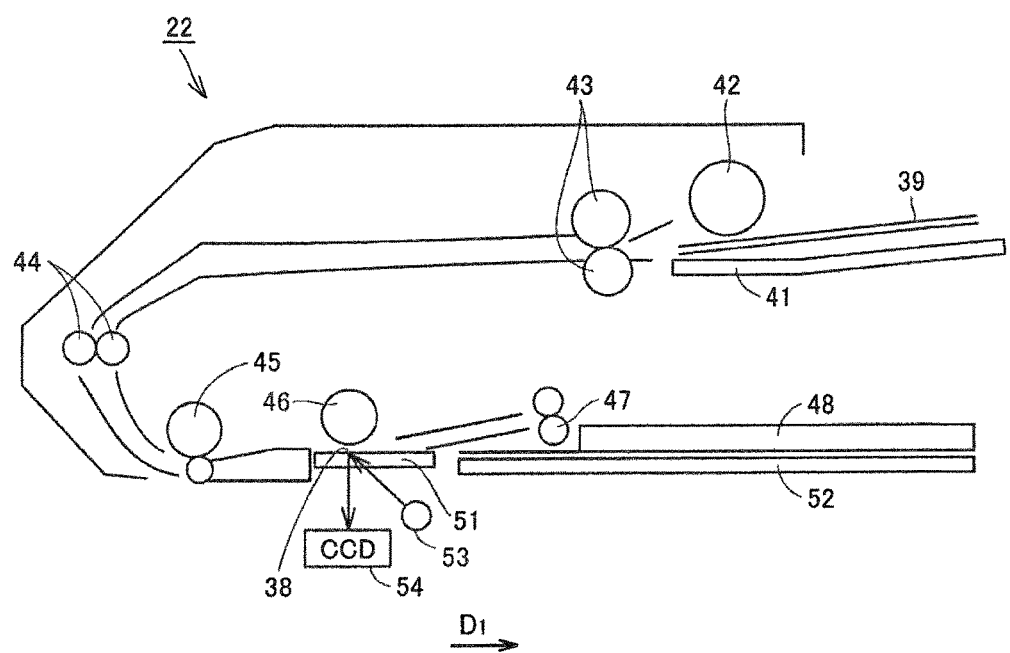
FIG. 4 is a schematic cross-sectional view illustrating a part of an ADF included in an image reading unit.

Next, a configuration of an ADF 22 included in the original image reading unit 14 included in the digital multifunction peripheral 11 according to this embodiment will be described. FIG. 4 is a schematic cross-sectional view illustrating a part of the ADF 22 included in the original image reading unit 14.

With reference to FIGS. 1 to 4, the ADF 22 includes an original document setting table 41 on which a plurality of original documents 39 that is to be conveyed is set, a pickup roller 42 configured to sequentially feed the original documents 39 set in on the original document setting table 41, a separation roller 43 configured to separate each of the original documents 39 that is to be conveyed from the rest one by one, conveyance rollers 44, 45, and 46 configured to convey the original documents 39 to a reading position 38, a paper discharging roller 47 configured to discharge the original documents 39 that have been read by the reading position 38, and a discharging tray 48 on which the original documents 39 that have been discharged are placed. The conveyance roller 46 is formed of a white member. Note that a vertical scanning direction in FIG. 4 is indicated by an arrow D1 in FIG. 4 or an opposite direction thereto.

The original image reading unit 14 including the ADF 22 includes a transparent plate 51 provided in a position that is opposed to the conveyance roller 46 in the conveyance direction of the original documents 39, a contact glass 52 that is provided in a position adjacent to the vertical scanning direction of the transparent plate 51 and serves as a mounting surface on which one of the original documents 39 is placed and an image of the original document 39 is read, and a carriage (not illustrated) that is disposed in an area below the transparent plate 51 and the contact glass 52 and is movable in the vertical scanning direction.

Also, the original image reading unit 14 includes a light source 53 configured to irradiate the original document 39 that has been conveyed by the ADF 22 with light such that the light transmits through the transparent plate 51, a plurality of mirrors (not illustrated), a lens (not illustrated) that collects light, and a charge coupled device (CCD) sensor 54 serving as an image sensor. The carriage includes the light source 53 and some of the plurality of mirrors. The light source 53 is formed by disposing a plurality of so-called light emitting diodes (LEDs) in the vertical scanning direction. In reading out an image of one of the original documents 39, which is conveyed by the ADF 22, the carriage is stopped in a position below the transparent plate 51. The light source 53 emits light to the reading position 38 in which the image of the original document 39 is read. Then, light reflected from the original document 39 that has been conveyed onto the transparent plate 51, that is, specifically, to the reading position 38, is collected by the plurality of mirrors and the lens and is caused to be input to the CCD sensor 54, thereby reading out the image of the original document 39, which has been conveyed, onto the reading position 38.

When a press-down of the start key 32 of the operation unit 13 is detected, the ADF 22 sequentially conveys the plurality of original documents 39 that have been set to the reading position 38. In the ADF 22, images of the original documents 39 are sequentially read by the CCD sensor 54 in the reading position 38 and the plurality of original documents 39 is sequentially discharged to the discharging tray 48.

Figures 5, 6:
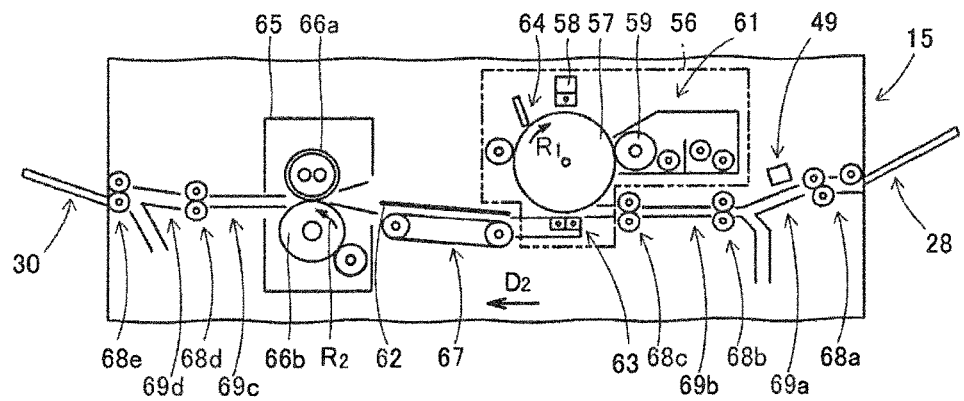
FIG. 5 is a cross-sectional view illustrating a schematic configuration of an image forming unit.
FIG. 6 is a conceptual diagram illustrating contents of image data stored in a hard disk.

Next, a configuration of the image forming unit 15 included in the digital multifunction peripheral 11 will be described. FIG. 5 is a cross-sectional view illustrating a schematic configuration of the digital multifunction peripheral 11 according to this embodiment. Note that, in order to facilitate understanding, in FIG. 5, hatching of a member is omitted. In other words, FIG. 5 is a cross-sectional view illustrating a cross section of the digital multifunction peripheral 11 taken along an imaginary plane extending in an up-down direction.

With reference to FIG. 5, the image forming unit 15 includes the developing device 56 configured to form a visible image on a sheet of paper using a developer, such as a toner, and the like. The developing device 56 indicated by an alternate long and two short dashes line in FIG. 4 includes a photoreceptor 57 configured to form an electrostatic latent image on a surface thereof, a charging unit 58 configured to charge the surface of the photoreceptor 57, a developing unit 61 that includes a developing sleeve 59 and a plurality of agitating rollers and is configured to feed a developer, such as a toner, and the like, onto a surface of the photoreceptor 57 on which an electrostatic latent image is formed and to thus form a visible image of the toner, a transfer unit 63 that includes a transfer charger and a separation charger and is configured to transfer the visible image formed on the surface of the photoreceptor 57 to a sheet of paper 62, which has been conveyed, and a cleaning unit 64 that includes a discharging roller, a cleaning blade, and the like, and is configured to remove the toner, residual electric charges, and the like, which remain on the surface of the photoreceptor 57 after the transfer of the visible image to the sheet of paper 62 has been performed.

The photoreceptor 57 rotates in the direction of an arrow R1 in FIG. 5. The image forming unit 15 forms an electrostatic latent image on the photoreceptor 57 on the basis of image read by the original image reading unit 14 and image data transmitted from the computers 26a, 26b, and 26c. The image forming unit 15 feeds a toner to the electrostatic latent image formed on the photoreceptor 57 to form a visible image of the toner. In developing, a developing bias voltage of a predetermined value is applied to the developing sleeve 59. Then, due to a potential difference between a surface potential of the photoreceptor 57 charged by the charging unit 58 and the developing bias voltage, the toner is moved from the developing sleeve 59 side onto a part of the surface of the photoreceptor 57 on which the electrostatic latent image is formed, to which the toner is to be supposed to be moved. The image forming unit 15 repeatedly performs charging, developing, transferring, and cleaning on the photoreceptor 57 to form a visible image of the toner on the sheet of paper 62, which has been conveyed. Note that an amount of the toner corresponding to the amount of the toner consumed by developing is fed to the developing element 61 at all times by a toner container (not illustrated) attachably and removably provided in the developing device 56.

The digital multifunction peripheral 11 includes a fixing device 65 configured to fix the visible image formed on the sheet of paper 62 by the developing device 56. The fixing device 65 includes, as a pair of rollers, a hollow, rotatable heat roller 66a configured to heat the sheet of paper 62 when the toner is fixed to the sheet of paper 62 and a solid, rotatable pressure roller 66b configured to rotate in the direction indicated by an arrow R2 in FIG. 5 and apply pressure to the sheet of paper 62 when the toner is fixed on the sheet of paper 62.

Note that the image forming unit 15 includes a conveying belt 67 provided between the developing device 56 and the fixing device 65, and a plurality of paper feeding rollers 68a, 68b, 68c, 68d, and 68e. For example, the sheet of paper 62 set in the manual paper feeding tray 28 is conveyed through paper conveyance paths 69a, 69b, 69c, and 69d by the paper feeding rollers 68a, 68b, 68c, 68d, and 68e, and is discharged to the discharging tray 30. Also, the sheet of paper 62 set in the paper feeding cassettes 23a, 23b, and 23c is conveyed to the paper conveyance paths 69b, 69c, and 69d by the paper feeding rollers 68b, 68c, 68d, and 68e, and is discharged to the discharging tray 30. The conveyance direction of the sheet of paper 62 is indicated by an arrow D2 in FIG. 5.

Note that the image forming unit 15 may also form an image on a printed materials set in the paper setting unit 19, that is, specifically, one of the manual paper feeding tray 28 and the paper feeding cassettes 23a, 23b, and 23c. That is, in the digital multifunction peripheral 11, first, an image may be formed, an output printed material may be set in the manual paper feeding tray 28 or the like, an image may be formed on an already printed print surface side, and then, the printed material may be output.

Also, the printed material image reading unit 49 included in the digital multifunction peripheral 11 is provided in a position between the paper feeding roller 68a and the paper feeding roller 68b on the paper conveyance path 69a. The printed material image reading unit 49 may read an image on a surface of the sheet of paper 62 serving as a printed material that is conveyed through the paper conveyance path 69a, which is to be a print surface. Specifically, similar to the original image reading unit 14 described above, the printed material image reading unit 49 includes a light source and a CCD sensor. The printed material image reading unit 49 irradiates the sheet of paper 62 with light from the light source, and reads the image printed on the print surface of the sheet of paper 62 from reflected light by the CCD sensor.

Also, the digital multifunction peripheral 11 includes an optical character recognition (OCR) mechanism 37 serving as a character distinguishing unit configured to distinguish a character from an image of an original document that has been read by the original image reading unit 14 and an image of a printed material that has been read by the printed material image reading unit 49.

Next, contents of data stored in the hard disk 16 described above will be described. FIG. 6 is a conceptual diagram illustrating contents of dictionary data stored in the hard disk 16.

With reference to FIG. 6, as dictionary data 71 for reference, character string data 72a, character string data 72b, character string data 72c, character string data 72d, character string data 72e, and character string data 72f each of which is formed of a plurality of characters are stored in the hard disk 16. Each of the character string data 72a, the character string data 72b, the character string data 72c, the character string data 72d, the character string data 72e, and the character string data 72f has a meaning as a character string. Specifically, the character string data 72a formed of three characters, that is, "ABC", is stored as data having a meaning of "XXXXX" such that "XXXXX" is associated with the character string data 72a formed of "ABC". The character string data 72b formed of three characters, that is, "BBC", is stored as data having a meaning of "YYYYY" such that "YYYYY" is associated with the character string data 72b formed of "BBC". The character string data 72c formed of three characters, that is, "ABE", is stored as data having a meaning of "ZZZZZ" such that "ZZZZZ" is associated with the character string data 72c formed of "ABE". The character string data 72d formed of three characters, that is, "AEE", is stored as data having a meaning of "WWWWW" such that "WWWWW" is associated with the character string data 72d formed of "AEE". The character string data 72e formed of three characters, that is, "DEF", is stored as data having a meaning of "VVVVV" such that "VVVVV" is associated with the character string data 72e formed of "DEF". The character string data 72f formed of three characters, that is, "ZEF", is stored as data having a meaning of "UUUUU" such that the "UUUUU" is associated with the character string data 72f formed of "ZEF".

Figure 7:
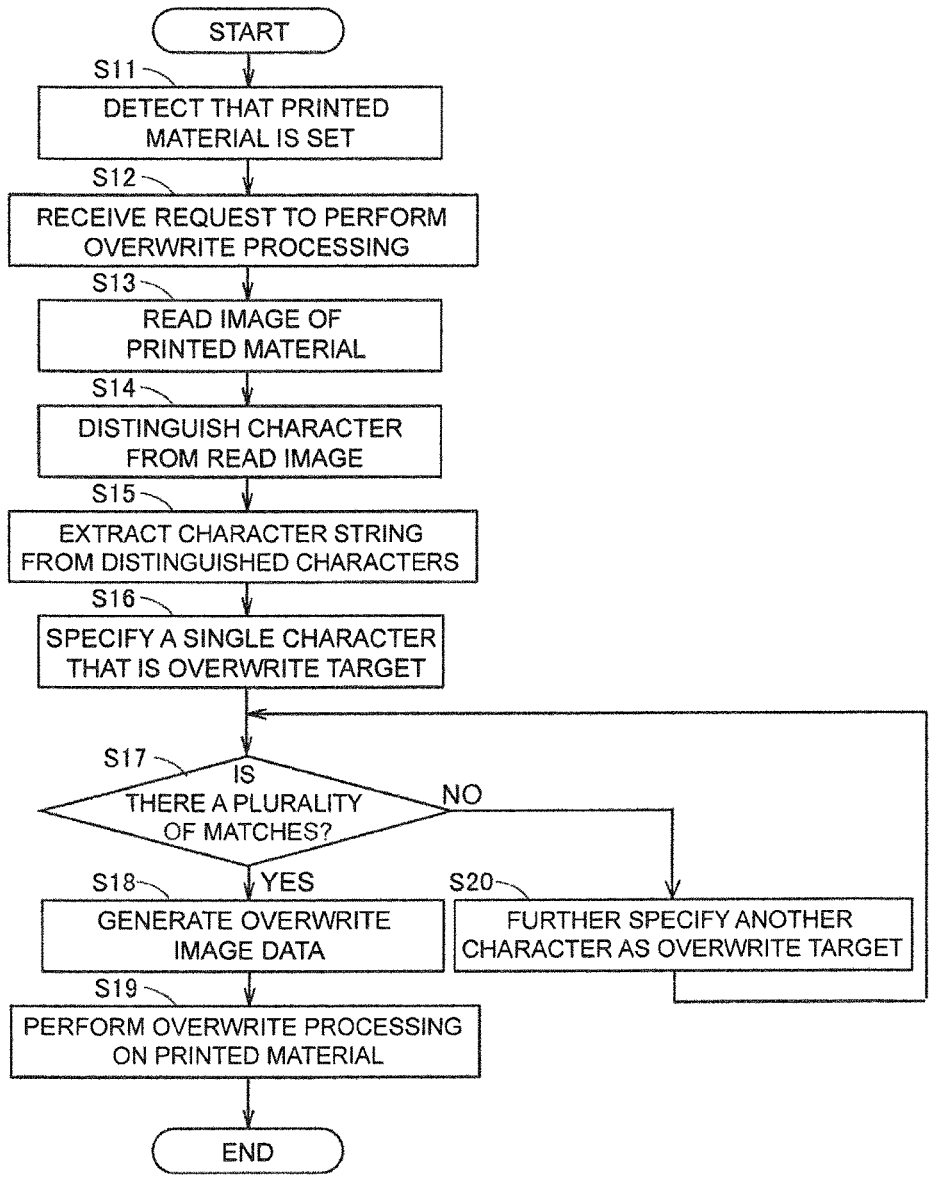
FIG. 7 is a flow chart illustrating contents of processing performed when overwriting of a character on a printed material is performed.

Next, using the digital multifunction peripheral 11 according to this embodiment, a case where an image is overwritten on a printed material so that the printed material is made illegible will be described. FIG. 7 is a flow chart illustrating contents of processing performed when overwriting of an image on a printed material is performed.

With reference to FIG. 7, a user sets a sheet of paper 62 as a printed material on which overwrite is desired to be performed in the manual paper feeding tray 28. Then, the digital multifunction peripheral 11 detects that the sheet of paper 62 was set in the manual paper feeding tray 28 (Step S11 in FIG. 7, and "Step" will be hereinafter will be omitted).

Figure 8:
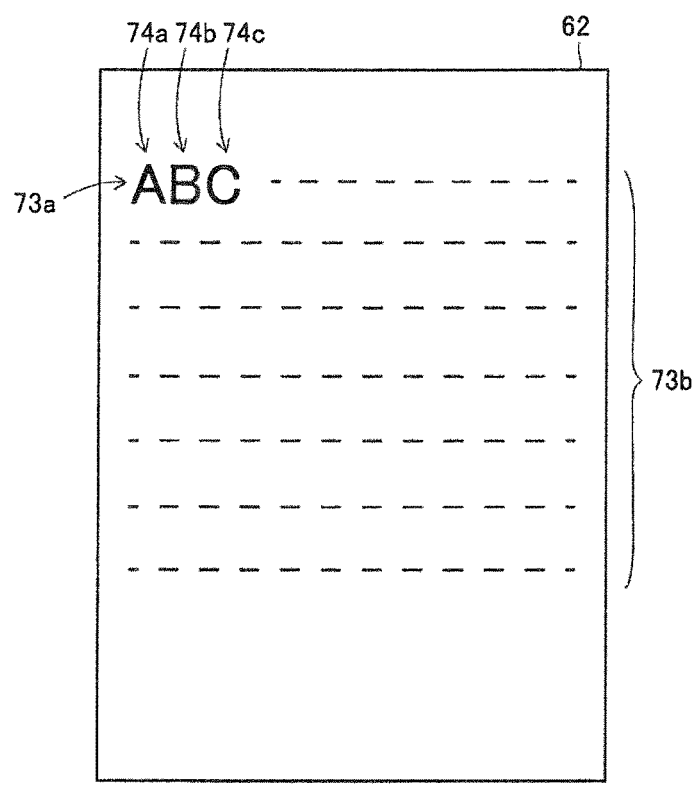
FIG. 8 is a view illustrating an example of a printed material on which overwriting is performed.

The printed material that was set in this case will be described. FIG. 8 is a view illustrating an example of the sheet of paper 62 serving as a printed material on which overwriting is performed. With reference to FIG. 8, a character image 73a formed of a character string "ABC" and another character image 73b formed of characters in several rows are printed on the sheet of paper 62 serving as a printed material.

Next, the user makes a request to overwrite the sheet of paper 62 set in the manual paper feeding tray 28 via the display screen 21 of the operation unit 13 or the like. Then, the digital multifunction peripheral 11 receives the request to overwrite the sheet of paper 62 (S12).

After receiving the request to overwrite the sheet of paper 62, the digital multifunction peripheral 11 conveys the sheet of paper 62 set in the manual paper feeding tray 28 toward the image forming unit 15.

In this case, before forming an image, that is, before the sheet of paper 62 that was conveyed reaches the developing device 56, an image of a print surface of the sheet of paper 62 is read by the printed material image reading unit 49 (S13). Specifically, the character images 73a and 73b printed on the print surface of the sheet of paper 62 are read by the printed material image reading unit 49.

Thereafter, a character is distinguished from the read image (S14). In this case, a character is distinguished from the image read by the printed material image reading unit 49 using the OCR mechanism 37. In this case, a character 74a of "A", a character 74b of "B", and a character 74c of "C" are distinguished. Also, the OCR mechanism 37 and the like operate as the character distinguishing unit.

The control unit 12 extracts a character string of "ABC" from the characters 74a, 74b, and 74c of "A", "B", and "C", which have been distinguished (S15). In this case, the control unit 12 and the like operate as the character string extraction unit.

Figure 9:
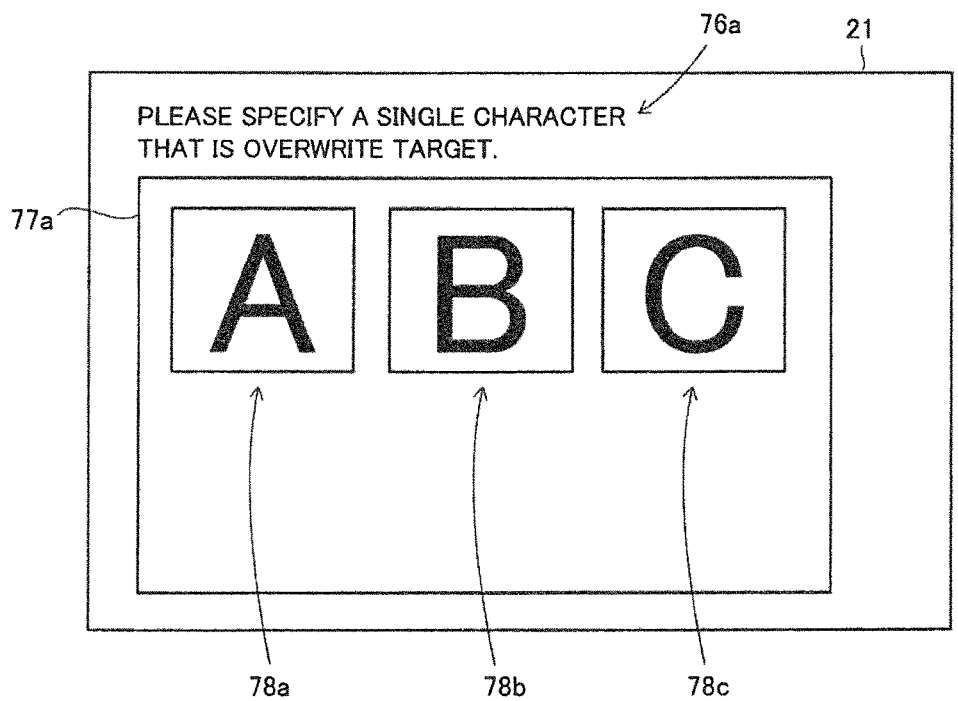
FIG. 9 is a view illustrating an example of a display screen of the operation unit when causing a user to specify a single character from a plurality of characters that form an extracted character string.

Next, the user is caused to specify a single character that is an overwrite target from a plurality of characters forming the extracted character string (S16). FIG. 9 is a view illustrating an example of the display screen 21 of the operation unit 13 in this case. With reference to FIG. 9, a message 76a saying, "Please specify a single character that is an overwrite target.", an area 77a in which each of the characters forming the extracted character string is described, and a character 78a of "A", a character 78b of "B", and a character 78c of "C" in the area 77a are displayed on the display screen 21 of the operation unit 13.

In this case, it is assumed that the user specified the character 78a of "A", which is an initial character among the characters 78a, 78b, and 78c that form the character string. That is, it is assumed that the character 78a of "A" is designated as an overwrite target character. Thus, the control unit 12 determines whether or not there is a plurality of matches between character string data formed of a part of the above-described character string other than the specified single character and respective parts of the character string data 72a, the character string data 72b, the character string data 72c, the character string data 72d, the character string data 72e, and the character string data 72f registered in the dictionary data 71, each of which is formed of characters other than a character in the same position as the sequence position of the specified character (S17).

Specifically, whether or not there is a plurality of character strings including "B" as the second character and "C" as the third character is determined with reference to the character string data 72a, the character string data 72b, the character string data 72c, the character string data 72d, the character string data 72e, and the character string data 72f registered in the dictionary data 71 stored in the hard disk 16. In this case, two of the pieces of character string data, that is, the character string data 72a and the character string data 72b, are determined as character string data that satisfies the above-described condition. That is, it is determined there is a plurality of matches (YES in S17).

This is based on the following idea. That is, if the single character of "A" is made indistinguishable by overwriting, a reader is not able to determine whether the rest of the characters, that is, specifically, a character string in which the second character is the character 78b of "B" and the third character is the character 78c of "C", was acquired by overwriting a part of the character string "ABC" having a meaning of "XXXXX" or by overwriting a part of the character string "BBC" having a meaning of "YYYYY". Therefore, for the character string acquired by overwriting the single character "A" thereof, it is not possible to uniquely analogize the original character string thereof, and thus, the printed material may be made illegible.

If it is determined that there is a plurality of matches, the control unit 12 generates overwrite image data with which overwriting is performed to make the specified single character indistinguishable (S18). Then, the control unit 12 operates as an overwrite image data generation unit. In this case, considering the position and size of the character "A" on the sheet of paper 62 that includes the character "A" and has been read, overwrite image data with which the character "A" is painted out by a solid black rectangle is generated.

Thereafter, using the generated overwrite image data, the image forming unit 15 serving as the printing unit performs printing on the sheet of paper 62 that has been set in the manual paper feeding tray 28 (S19). That is, using the developing device 56 described above, a solid black image is overwritten on a part of the conveyed sheet of paper 62 in which the character "A" is located and is fixed thereon by the fixing device 65, and the sheet of paper 62 is output.

Figure 10:
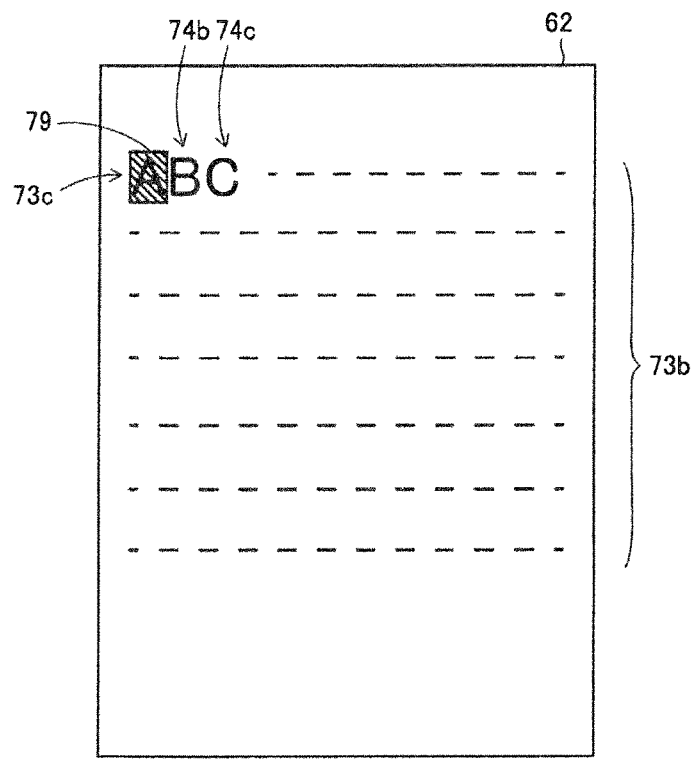
FIG. 10 is a view illustrating paper as an output printed material.

FIG. 10 is a view illustrating the sheet of paper 62 as the output printed material. With reference to FIG. 10, a solid black image 79 that is formed of the hatched rectangle of a single color of black, the character 74b of "B", the character 74c of "C", and the character image 73b are printed on the sheet of paper 62. A position in which the solid black image 79 is formed is a position in the original printed material in which the character 74a of "A" was arranged. In this case, in a newly formed image, only a solid black image appears. Thus, overwriting of the image is performed.

Next, a case where a read character string is not "ABC" but, for example, "ABE" will be described. In this case, after the sheet of paper 62 is read, as described above, the user is caused to specify a single character that is overwritten. If the character "A", which is the initial character, is specified, the control unit 12 determines whether or not there is a plurality of character strings including "B" as the second character and "E" as the third character with reference to the character string data 72a, the character string data 72b, the character string data 72c, the character string data 72d, the character string data 72e, and the character string data 72f registered in the dictionary data 71 stored in the hard disk 16. Then, the control unit 12 operates as the determination unit. In this case, only one of the pieces of the character string data, that is, the character string data 72c, satisfies the above-described condition. That is, it is determined that there is not a plurality of matches but there is only a single match (NO in S17).

If it is determined that there is only a single match, the original character string may be uniquely analogized even when overwriting is performed on the character "A" as it is. Therefore, it is suggested the user to further specify another single character as an overwrite target (S20).

Figure 11:
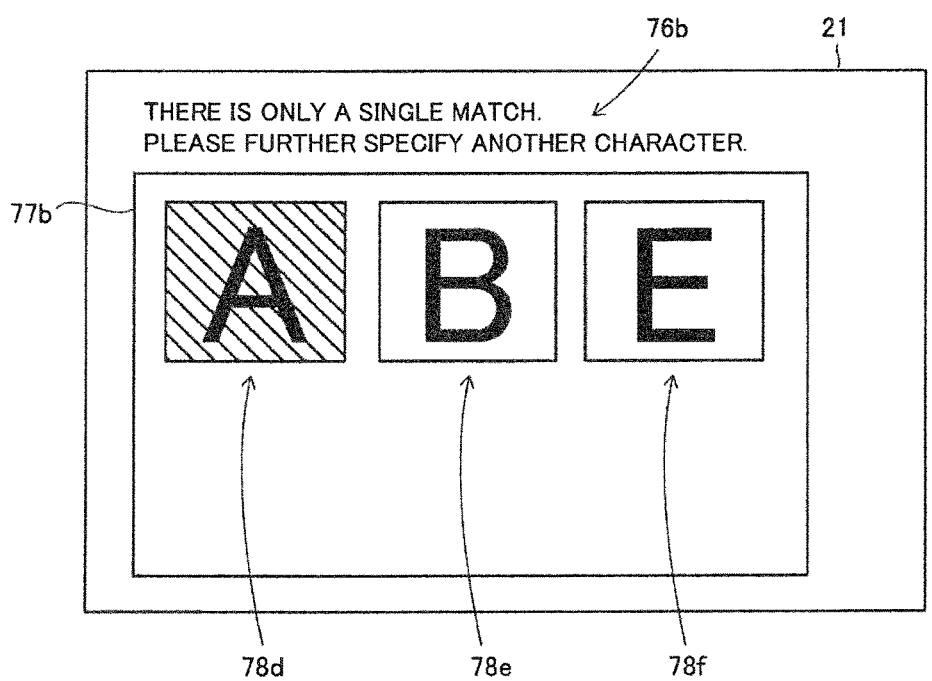
FIG. 11 is a view illustrating an example of the display screen of the operation unit when suggesting the user to further specify another single character as an overwrite target.

Specifically, as illustrated in FIG. 11, a message 76b, as an alert, saying, "There is only a single match. Please further specify another character." is displayed, and also, an area 77b in which characters forming an extracted character string are described, and a character 78e of "B" and a character 78f of "E" in the area 77b are displayed on the display screen 21 of the operation unit 13. Thus, the user is caused to specify another character than a character 78d of "A", which is the initial character". Note that, for the character 78d of "A", which has been already specified, it is indicated by hatching that the character 78d has been already specified.

Then, it is assumed that, among the characters 78e and 78f forming the character string, the user specified the character 78e of "B", which is located in the second position. Then, the control unit 12 determines whether or not there is a plurality of matches between character string data formed of a part of the above-described character string other than the two specified characters, including the further specified character, and respective parts of the pieces of the character string data registered in the dictionary data, each of which is formed of characters other than a character in the same position as the sequence position of each of the specified characters (S17). That is, the control unit 12 determines whether or not there is a plurality of character strings including the character "E" as the third character, regardless of the first and second characters, with reference to the character string data 72a, the character string data 72b, the character string data character string data 72c, the character string data 72d, the character string data 72e, and the character string data 72f registered in the dictionary data 71 stored in the hard disk 16.

In this case, two of the pieces of character data, that is, the character string data 72c and the character string data 72d, satisfy the above-described condition. That is, it is determined there is a plurality of matches.

Next, the control unit 12 generates overwrite image data with which overwriting is performed such that the specified characters are indistinguishable as characters (S18). In this case, considering the position and size of each of the characters "A" and "B" in the sheet of paper 62 that includes the characters "A" and "B" and has been read, overwrite image data with which the characters "A" and "B" are painted out by a solid black rectangle is generated.

Thereafter, using the generated overwrite image data, the image forming unit 15 serving as the printing unit performs printing on the sheet of paper 62 that has been set in the manual paper feeding tray 28 (S19). That is, using the developing device 56 described above, a solid black image is overwritten on a part of the sheet of paper 62 in which the characters "A" and "B" are located and is fixed thereon by the fixing device 65, and the sheet of paper 62 is output.

In the digital multifunction peripheral 11 described above, the printed material image reading unit 49 reads an image of a printed material. Then, the OCR mechanism 37 distinguishes a character and extracts a character string. Thereafter, whether or not there is a plurality of matches between character string data formed of a part other than a specified character of the above-described character string and respective parts of the pieces of character string data registered in the dictionary data which is stored in the hard disk 16 and in which a plurality of character stings each of which is formed of a plurality of characters are registered in advance, each of which is formed of characters other than a character in the same position as the sequence position of the specified character. Then, if it is determined that there is a plurality of matches, overwrite character string data that has been overwritten such that the specified character is indistinguishable as a character is generated, and printing is performed on a printed material using the overwrite character string data. Thus, since the user is caused to specify a character that is an overwrite target one character by one character and then whether or not there is a plurality of matches is determined, a probability that an original character, an original sentence, and the like are legible may be reduced. Also, in generating overwrite image data, a probability that unnecessary overwrite data is generated may be reduced. Therefore, in the digital multifunction peripheral 11 described above, security may be efficiently increased while reducing the toner consumption.

In this case, if the determination unit determines that there is a single match, another character is further specified and determination is performed until it is determined that there is a plurality of matches, and therefore, security may be more reliably increased.

Also, in this case, whether or not a character is an overwrite target is determined one character by one character, and therefore, the toner consumption may be more efficiently reduced while increasing security.

Note that, in generating overwrite image data, the following may be employed. That is, when a character string and another character string are included in a printed material, considering also the relationship with the another character string, overwrite image data may be generated.

A case where a character string "ABC" and a character string "DEF" are arranged as a first clause and a second clause, respectively, will be described below. For the character string "ABC", as described above, if a character "A" is overwritten, the character string may not be uniquely analogized. For the character string "DEF", if a character "D" as an initial character is overwritten, it is not possible to uniquely analogize the character string. However, when the character strings are combined, there may be a case where the character strings may be uniquely analogized.

In such a case, dictionary data including combinations of character strings is prepared. Then, for the combinations of character strings, using the dictionary data including combinations of character strings, whether or not there is a plurality of matches is determined. The user is caused to specify a character that is an overwrite target one character by one character until it is determined that there is a plurality of matches, and overwrite image data is generated. Overwriting may be performed in the above-described manner.

Also, for dictionary data stored in the hard disk 16, not only a single piece of dictionary data but also a plurality of pieces of dictionary data may be stored. Then, using the plurality of pieces of dictionary data, that is, with reference to the plurality of pieces of dictionary data, determination of the determination unit may be performed.

Note that, in the above-described embodiment, although overwrite image data is rectangular solid black image data, overwrite image data is not limited thereto, and any overwrite image data with which overwriting is performed on a character such that the character is indistinguishable may be generated.

In this case, for example, a character similar to a certain character is registered in advance, and when a character is specified as an overwrite target, overwrite image data may be generated using a character selected from characters registered in advance. That is, the overwrite image data generation unit may be configured to generate, in generating overwrite image data for a specified character, overwrite image data using a character selected from characters registered for the character that is an overwrite target. For example, as similar characters, there are upper capital alphabets "O", "Q", "C", and "G" the curved parts of which are specifically similar to one another. Also, as similar characters, there are upper capital alphabets "P", "B", "R", "F", and "E" the longitudinally and transversely extending linear parts of which are specifically similar to one another mainly.

Figure 12:
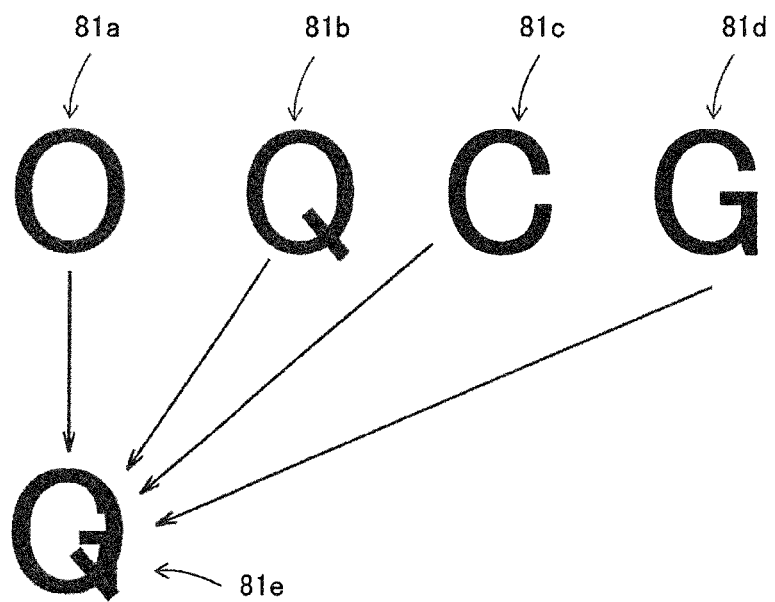
FIG. 12 is a view illustrating overwrite image data when overwriting of another character is performed.

FIG. 12 is a view illustrating overwrite image data when overwriting of another character is performed. With reference to FIG. 12, for example, when overwriting is performed on a character 81a of the upper capital alphabet "O", a character 81b of the upper capital alphabet "Q", a character 81c of the upper capital alphabet "C", and a character 81d of the upper capital alphabet "G" are overwritten thereon. That is, for the single character 81a of the upper capital alphabet "O", overwriting is performed such that the characters 81b, 81c, and 81d of the three upper capital alphabets, that is, "Q", "C", and "G", are superimposed thereon. Thus, an image 81e that is made of the characters 81a, 81b, 81c, and 81d of four alphabets and looks like a character is formed. Overwrite image data may be generated such that this image is overwritten on the character 81a of "O". Thus, the amount of the consumed toner may be saved more than when a solid black image is used. In this case, it is difficult to analogize which one of the characters 81a, 81b, 81c, and 81d of the four upper capital alphabets "O", "Q", "C", and "G" was overwritten, and therefore, the achieved image does not have any problem in terms of security.

In a case where the above-described image 81e illustrated in FIG. 12 is formed, the image 81e may be formed such that an image is not formed in an area thereof which overlaps with an original character and an image is formed only in a part of the image which is newly added. That is, the overwrite image data generation unit may be configured to generate overwrite image data such that an image is not formed on a part that overlaps with the original character.

Figure 13:
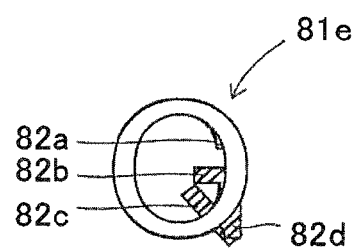
FIG. 13 is a view illustrating an image of overwrite image data.

FIG. 13 is a view illustrating the image 81e of overwrite image data in this case. Note that, in order to facilitate understanding, the character of the upper capital alphabet "O", which is the original character, is illustrated as an outline character. Also, the area of the image which is newly added is indicated by hatching.

With reference to FIG. 13, when the image 81e is formed by superimposing the four characters 81a, 81b, 81c, and 81d, the character of the upper capital alphabet "O" is already printed as the original image on a printed material. Therefore, in forming the image 81e, each of images 82a, 82b, 82c, and 82d, which are areas missing as the image 81e, may be generated as overwrite image data. Specifically, each of the image 82a that forms a part of each of the characters "C" and "G", the image 82b that forms a part of the character "G", the image 82c that forms a part of the character "Q", and the image 82d that forms a part of the character "G" are generated as overwrite image data. Thus, the toner may be efficiently saved.

Figure 14:
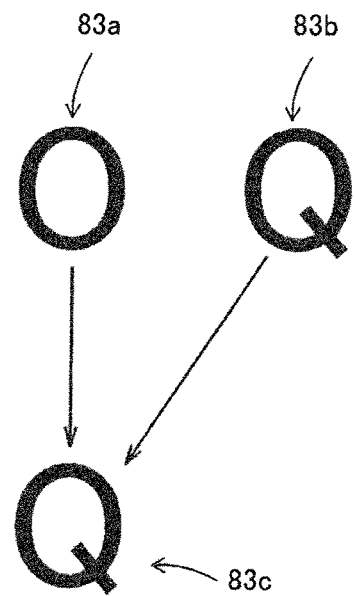
FIG. 14 is a view illustrating an image of overwrite image data obtained by superimposing two characters.
Figure 15:
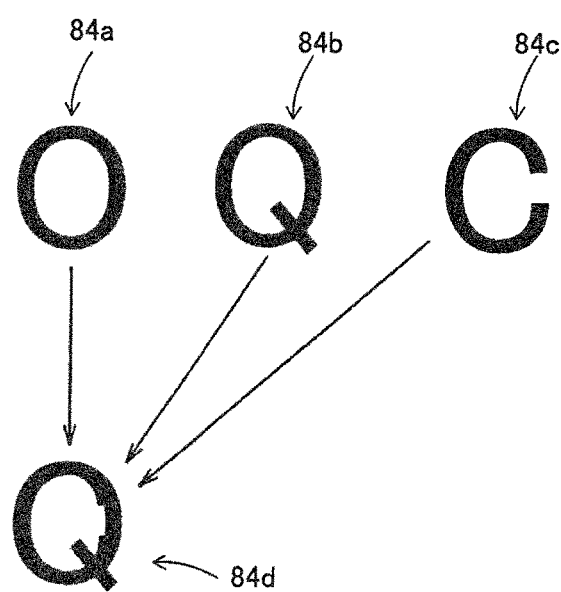
FIG. 15 is a view illustrating an image of overwrite image data obtained by superimposing three characters.

Also, as illustrated in FIG. 14, the character 83a of "O" and the character 83b of "Q" may be superimposed to form an image 83c of "Q" and, as illustrated in FIG. 15, a character 84a of "O", a character 84c of "Q", and a character 84c of "C" may be superimposed to form an image 84d that looks like something in which the three characters are superimposed may be formed.

Figure 16:
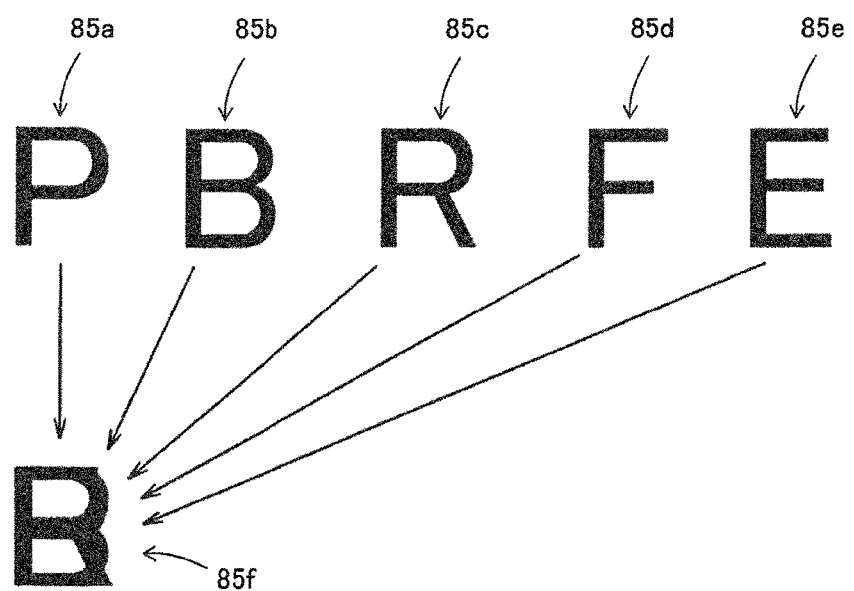
FIG. 16 is a view illustrating an image of overwrite image data obtained by superimposing five characters.

Also, as illustrated in FIG. 16, a character 85a of "P", a character 85b of "B", a character 85c of "R", a character 85d of "F", and a character 85e of "E" may be superimposed to form an image 85f that looks like something in which the above-described five characters are superimposed.

In this case, the number of characters that are superimposed and a security level may be set so as to have a correlation therebetween. That is, as the number of characters that are superimposed increases, the security level increases, but the toner consumption accordingly increases. In Table 1, the relationship between the number of characters that are superimposed on an original character and the security level is illustrated.

TABLE 1

| SECURITY LEVEL | NUMBER OF CHARACTERS THAT ARE SUPERIMPOSED |
| --- | --- |
| 1 (VERY LOW) | ONE |
| 2 (LOW) | TWO |
| 3 (LITTLE LOW) | THREE |
| 4 (STANDARD) | FOUR |
| 5 (LITTLE HIGH) | FIVE |
| . | . |
| . | . |
| . | . |

With reference to Table 1, when the number of characters that are superimposed is one, that is, when, as illustrated in FIG. 14, an image in which consequently two characters are superimposed is generated as overwrite image data, the security level is very low. As illustrated in FIG. 15, when the number of characters that are superimposed is two, the security level is increased to a higher level than that when the number of characters that are superimposed is one, but the security level is still low. As illustrated in FIG. 12, when the number of characters that are superimposed is three, the security level is further increased to a higher level than that when the number of characters that are superimposed is two, but the security level is still a little low. As illustrated in FIG. 16, when the number of characters that are superimposed is four, the security level is still further increased to a higher level than that when the number of characters that are superimposed is three, and the security level is standard. When the number of characters that are superimposed is five, the security level is still further increased to a higher level than that when the number of characters that are superimposed is four, and the security level is a little high.

In the dictionary data described above, as the number of references to character strings in the dictionary data increases, the security level increases. That is, for character string data that is a determination target, when the dictionary data is referred to, as the number of character strings that correspond to the character string data increases, it gets more difficult to analogize a meaning that corresponds to the character string data, and the security level increases. However, the number of characters that are overwrite targets increases and, as a result, the toner consumption increases. In Table 2, the relationship between the number of character strings in the dictionary data, to which are referred, and the security level is illustrated.

TABLE 2

| SECURITY LEVEL | NUMBER OF REFERENCES TO CHARACTERS STRINGS |
| --- | --- |
| 1 (VERY LOW) | TWO GROUPS OF MORE |
| 2 (LOW) | THREE GROUPS OF MORE |
| 3 (LITTLE LOW) | FOUR GROUPS OF MORE |
| 4 (STANDARD) | FIVE GROUPS OF MORE |
| 5 (LITTLE HIGH) | SIX GROUPS OF MORE |
| . | . |
| . | . |
| . | . |

With reference to Table 2, when the number of references to character strings in the dictionary data is two groups, the security level is very low. When the number of references to character strings in the dictionary data is three groups, the security level is increased to a higher level than that when the number of references to character strings is two groups, but the security level is still low. When the number of references to character strings in the dictionary data is four groups, the security level is increased to a higher level than that when the number of references to character strings is three groups, but the security level is a little low. When the number of references to character strings in the dictionary data is five groups, the security level is further increased to a higher level than that when the number of references to character strings is four groups, and the security level is standard. When the number of references to character strings in the dictionary data is six groups, the security level is still further increased to a higher level than that when the number of references to character strings is five groups, and the security level is a little high.

Therefore, in view of a request of the user, that is, specifically, required security level and toner consumption, the number of characters that are superimposed and the number of references to character strings in the dictionary data may be determined. In this case, the toner consumption and the security level are in a reciprocal relationship, and therefore, the security level may be set by the user. That is, the digital multifunction peripheral 11 may be configured to include a security level setting unit configured to cause the user to set the security level, and the overwrite image data generation unit may be configured to generate overwrite image data in accordance with the security level set by the security level setting unit. In this case, for example, in the display screen 21 of the operation unit 13, a screen via which the security level is input is provided, and the number of references to character strings in the dictionary data and the number of characters that are superimposed are set in accordance with input contents thereof.

In this case, the control unit 12 may be configured such that, depending on the number of characters that are superimposed, which has been designated, if it is determined that the number reaches the level with which security may not be ensured in the relationship with the character strings, the user is informed by an alert or the like that the security level is insufficient.

Also, in an image read by the printed material image reading unit 49, if a keyword related to security, that is, for example, a character string "confidential" is extracted, and if an image of a personal seal is recognized, the security level may be increased and overwrite image data may be generated with an increased security level.

Based on the foregoing, in the digital multifunction peripheral 11 described above, security may be efficiently increased while reducing the toner consumption.

Note that, although, in the above-described embodiment, as the storage unit that stores the dictionary data, the hard disk 16 is used, the embodiment is not limited thereto and, for example, an external storage device or the like may be employed as the storage unit. Also, the dictionary data stored in another computer may be used via the network 25. That is, as a configuration that does not include the hard disk 16 that stores dictionary data, the digital multifunction peripheral 11 may be configured to refer to the dictionary data via the network 25.

Also, although, in the above-described embodiment, the printed material image reading unit provided in a paper conveyance path reads an image of a printed material, the embodiment is not limited thereto, and a printed material is first set in the ADF 22 and causes an image to be read. Thereafter, data of the image that has been read is stored in the hard disk 16, and then, when the printed material set in one of the paper feeding cassettes 23a, 23b, and 23c and the manual paper feeding tray 28 is conveyed again to the image forming unit 15 to perform overwriting, overwriting may be performed using the stored data of the image.

Note that, although, in the above-described embodiment, an image on one of surfaces of a printed material is read to generate overwrite image data, the embodiment is not limited thereto and, if an image is printed on both surfaces of a printed material, the images on the both surfaces may be read to generate overwrite image data for each of the images.

Also, although, in the above-described embodiment, the user is caused to designate a character that is an overwrite target via the display screen 21 of the operation unit 13, the embodiment is not limited thereto and, for example, an initial character of an extracted character string may be specified as a character that is an overwrite target without causing the user to designate a character. As a matter of course, a character other than the initial character may be specified as a character that is an overwrite target. Also, if the initial character is specified and then it is determined that there is only a single match, the second character may be specified as an overwrite target, and thereafter, characters that are overwrite targets may be sequentially specified from the initial character. Also, in this case, a character that is an overwrite target is not limited to the second character and may be specified at random.

Note that the digital multifunction peripheral 11 may be configured to further include a font information extraction unit configured to extract information of the font of a distinguished character. Then, the overwrite image data generation unit may be configured to generate overwrite image data such that another character is superimposed in accordance with the information of the font of the character that has been extracted by the font information extraction unit. Thus, more proper overwrite image data may be generated. Note that, in generating overwrite image data, a font that is close to the distinguished character is selected from fonts that have been registered in the hard disk 16 in advance to generate overwrite image data.

Also, when a character is overwritten, in view of reduction in printing error and increase in security, a bold character may be generated as overwrite image data for a character of an original printed material.

The embodiment and examples disclosed herein are provided merely for illustrative purpose in every respect and it should be understood that the embodiment and examples are not intended to be limiting in any aspect. The scope of the present disclosure is defined by the scope of claims rather than the above-described description, and is intended to include any modifications within the scope and meaning equivalent to the terms of the claims.

An image forming apparatus according to the present disclosure is effectively used when it is required to efficiently increase security while reducing toner consumption.

What is claimed is:

1. An image forming apparatus comprising:
   a printed material setter configured to cause a user to set a printed material on which a character is printed therein;
   a printer configured to perform printing on the printed material set in the printed material setter;
   a printed material image reader configured to read an image printed on the printed material set in the printed material setter;
   a character distinguisher configured to distinguish a character from the image read by the printed material image reader;
   a character string extractor configured to extract a character string formed of a plurality of characters distinguished by the character distinguisher;
   a character specifier configured to cause the user to specify one of the plurality of characters forming the character string extracted by the character string extractor;
   a determiner configured to determine whether or not there is a plurality of matches between character string data formed of a part of the extracted character string other than the character specified by the character specifier and respective parts of character string data registered in dictionary data in which a plurality of character strings each of which is formed of a plurality of characters are registered in advance, each of which is formed of characters other than a character in the same position as a sequence position of the character specified by the character specifier;
   an overwrite image data generator configured to
      generate, if the determiner determines that there is a plurality of matches, overwrite image data that has been overwritten such that the character specified by the character specifier is indistinguishable as a character, and
      if the determiner does not determine that there is a plurality of matches, not to generate the overwrite image data; and
   a controller configured to perform control using the overwrite image data generated by the overwrite image data generator so as to cause the printer to perform printing on the printed material set in the printed material setter.

2. The image forming apparatus according to claim 1, wherein, if the determiner determines that there is a single match, the controller performs control to cause the character specifier to cause the user to further specify another character one character by one character, and the determiner to perform determination until the determiner determines that there is a plurality of matches.

3. The image forming apparatus according to claim 1, wherein the overwrite image data generator generates overwrite image data such that the character specified by the character specifier is indistinguishable as a character by overwriting another character.

4. The image forming apparatus according to claim 3, wherein, in generating overwrite image data for the character specified by the character specifier, the overwrite image data generator generates the overwrite image data by superimposing a character selected from characters registered on the character that is an overwrite target.

5. The image forming apparatus according to claim 1, wherein the overwrite image data generator generates the overwrite image data such that an image is not formed on a part that overlaps with a character that is overwritten.

6. The image forming apparatus according to claim 1, further comprising:

a security level setter configured to cause the user to set a security level, wherein the overwrite image data generator generates the overwrite image data in accordance with the security level set by the security level setter.

7. The image forming apparatus according to claim 1, further comprising:

a storage configured to store the dictionary data.

8. The image forming apparatus according to claim 1, further comprising:

a font information extractor configured to extract information of a font of the character distinguished by the character distinguisher, wherein the overwrite image data generator generates overwrite image data by superimposing another character in accordance with the information of the font of the character extracted by the font information extractor.

* * * * *